United States Patent [19]

Weise et al.

[11] 4,390,656

[45] Jun. 28, 1983

[54] FLAME-RESISTANT MOLDING COMPOSITIONS

[75] Inventors: Carlos Weise, Burghausen; Dietrich Wolfer, Untereching; Jörg Patzke, Burghausen, all of Fed. Rep. of Germany

[73] Assignee: Wacker-Chemie GmbH, Munich, Fed. Rep. of Germany

[21] Appl. No.: 223,605

[22] Filed: Jan. 9, 1981

[30] Foreign Application Priority Data

Jan. 24, 1980 [DE] Fed. Rep. of Germany ....... 3002397

[51] Int. Cl.³ .................... C08K 3/04; C08L 83/06
[52] U.S. Cl. .................... 524/493; 524/496; 524/503; 524/506; 524/537; 524/538; 524/539; 524/540; 524/542; 204/159.13
[58] Field of Search .......... 525/105, 1; 524/495, 524/496, 506, 493, 503, 537, 538, 539, 540, 542

[56] References Cited

U.S. PATENT DOCUMENTS

| | | | |
|---|---|---|---|
| 2,888,419 | 5/1959 | Safford | 524/506 |
| 3,078,006 | 2/1963 | Price et al. | 524/496 |
| 3,922,246 | 11/1975 | Ceyzeriat et al. | 525/1 |
| 4,150,013 | 4/1979 | Punderson | 525/1 |

OTHER PUBLICATIONS

Chemical Abstracts 85:125966f, Katsuyoshi et al., (1976).
Chemical Abstracts 77:63541n, Iwamatsu et al., (1972).

*Primary Examiner*—Wilbert J. Briggs, Sr.

[57] ABSTRACT

Flame-resistant molding compositions are prepared by adding at least one substance selected from the class consisting of (a) oxides or hydroxides of the rare earth metals, (b) graphite, or (c) precious metals or their compounds or complexes and mixtures of (a), (b) or (c) to a composition containing mixtures of organic polymers other than diorganopolysiloxanes and diorganopolysiloxanes. Although it is not essential, silicon dioxide having a surface area of at least 50 m²/g and crosslinking agents may be incorporated in these molding compositions.

15 Claims, No Drawings

FLAME-RESISTANT MOLDING COMPOSITIONS

The present invention relates to flame-resistant compositions and more particularly to flame-resistant molding compositions.

BACKGROUND OF THE INVENTION

Flame-resistant molding compositions containing organic polymers and diorganopolysiloxanes are known in the art. For example, U.S. Pat. No. 3,428,707 to Amos et al. describes a flame-resistant composition containing a vinyl chloride polymer in combination with a minor amount of certain elastomeric copolymer modifiers and a small but effective amount of certain diorganopolysiloxanes. Also, U.S. Pat. No. 3,239,579 to Barber et al. describes a molding composition containing a minor amount of a non-liquid benzene-soluble diorganopolysiloxane and a major amount of a thermoplastic alkenyl aromatic resin such as polystyrene or a copolymer containing a major proportion of styrene and a minor proportion of alpha-methylstyrene and finely divided silica.

In contrast to the molding compositions described above, the molding compositions of this invention containing organic polymers other than organopolysiloxanes in combination with organopolysiloxanes and optionally silicon dioxide having a surface area of at least 50 m$^2$/g exhibit a higher degree of flame-resistance than the previously known compositions.

Therefore, it is an object of this invention to provide a composition which can be molded by compression, injection or an extrusion process to form plastic articles. Another object of this invention is to provide a molding composition having good mechanical properties. Still another object of this invention is to provide a molding composition having excellent electrical properties. A further object of this invention is to provide a molding composition having improved flame-resistant properties.

SUMMARY OF THE INVENTION

The foregoing objects and others which will become apparent from the following description are accomplished in accordance with this invention, generally speaking, by providing flame-resistant molding compositions containing mixtures of organic polymers other than diorganopolysiloxanes and diorganopolysiloxanes and optionally silicon dioxide having a surface area of at least 50 m$^2$/g and at least one substance selected from the class consisting of (a) oxides or hydroxides of the rare earth elements (b) graphite, or (c) precious metals or their compounds or complexes and mixtures of (a), (b) or (c).

DETAILED DESCRIPTION OF THE INVENTION

Organic polymers which may be employed in the compositions of this invention are polymers which are obtained from the polymerization of at least one organic compound having at least one aliphatic carbon-carbon double bond. Suitable organic compounds having at least one aliphatic carbon-carbon double bond, are for example hydrocarbons such as ethylene, which may be polymerized by low-pressure, moderate-pressure or high-pressure polymerization, propylene, isobutylene, methylbutene-1, butene-1, methylpentene-1, isoprene, butadiene, styrene, hexadiene, dicyclopentadiene or ethylidenenorbornene and chlorinated hydrocarbons such as vinyl chloride, vinylidene chloride and chloroprene. Other examples of organic compounds which may be employed are alpha, beta-unsaturated acids or their derivatives, such as acrylic acid, methacrylic acid, acrylamide, methacrylamide, acrylonitrile, methacrylonitrile, methyl acrylate, methyl methacrylate or ethyl methacrylate; and carboxylic acid esters of unsaturated alcohols, such as vinyl acetate or vinyl laurate.

Additional examples of polymers which are produced by the polymerization of more than one organic compound with at least one aliphatic carbon-carbon double bond are those from ethylene and propylene, terpolymers from ethylene, propylene and a diene (EPDM), such as butadiene, hexadiene, dicyclopentadiene or ethylidenenorbornene, from ethylene and butadiene-1, from isobutylene and isoprene, from ethylene and vinyl acetate, from butadiene and acrylonitrile, from styrene and butadiene, from styrene and acrylonitrile, from styrene and methacrylate, from acrylonitrile, styrene and butadiene, from ethylene and methyl acrylate, and from vinyl chloride and vinyl acetate.

Other polymers which may be employed are those polymers obtained by further reacting a polymer produced by the polymerization of at least one organic compound with at least one aliphatic carbon-carbon double bond. Examples of such polymers are polyvinyl alcohols, saponification products of copolymers of ethylene and vinyl acetate, polyvinyl acetals such as polyvinyl butyrals, and chlorosulfonated polyethylenes.

Examples of other organic polymers are polyamides, polyimides, polycarbonates, polyurethanes, polyacetals, other polyethers such as polyphenylene ether and polyglycols, for example, poly(propylene oxide) allyl glycidyl ether, polysulfones, polyesters such as polyterephthalic acid esters, polyepichlorohydrins and polycarbodiimides.

Additional polymers which may be employed at least as components of mixtures, are polymers which are linked by chemical bonding to organopolysiloxanes, including diorganopolysiloxanes, and which represent graft polymers or block copolymers, or those produced in the presence of organopolysiloxanes including diorganopolysiloxanes, by the polymerization of at least one organic compound having at least one aliphatic carbon-carbon double bond.

Examples of such polymers are organopolysiloxane-polyolefins, organopolysiloxane-polystyrene, organopolysiloxane-polyacrylates, organopolysiloxane-polyamides, organopolysiloxane-polycarbonates, organopolysiloxane-polyethers, organopolysiloxane-polycarbodiimides and organopolysiloxane-polyurethanes, as well as organopolysiloxane-poly(ethylene-vinyl-acetate).

Several of the polymers which are chemically linked to organopolysiloxanes or which are at least produced in the presence of organopolysiloxanes by the polymerization of at least one organic compound having at least one aliphatic carbon-carbon double bond, are described in U.S. Pat. No. 4,211,729 to Marquardt et al.; U.S. Pat. No. 4,080,400 to Martin; and U.S. Pat. No. 4,123,472 to Getson et al.

The molding composition of this invention may contain a single type of organic polymer other than a diorganopolysiloxane as well as a mixture of at least two different types of organic polymers.

The term "diorganopolysiloxanes" as used herein refers to organosilicon compounds which are composed of at least 90 percent by weight of diorganopolysiloxane units and are preferably free of Si-bonded hydrogen.

The molding compositions of this invention preferably contain those diorganopolysiloxanes which can be represented by the following general formula:

$$Z_nSiR_{3-n}O(SiR_2O)_xSiR_{3-n}Z_n,$$

where R represents the same or different monovalent hydrocarbon radicals or substituted monovalent hydrocarbon radicals, Z represents a hydroxyl group or hydrocarbon ether group, n is 0 or 1, and preferably 0 for a majority of the diorganopolysiloxanes, and x is a number having a value such that the average viscosity of the diorganopolysiloxanes is at least 50 mPa.s at 25° C. It is preferred that the value of x be high enough so that the viscosity of the diorganopolysiloxanes is at least $10^6$ mPa.s at 25° C.

In addition to the diorganosiloxane units ($SiR_2O$), which are present within or along the siloxane chain of the diorganopolysiloxanes represented above, other siloxane units can be present in such a proportion that the amount of $SiR_2O$ units is at least 90 percent by weight based on the weight of the diorganopolysiloxanes. Examples of such other siloxane units, which are generally present only as impurities, are those of formulas $RSiO_{3/2}$, $R_2SiO_{1/2}$, and $SiO_{4/2}$, where R is the same as above.

In the formula represented above, the value of n can be the same or different for the same or different molecules. Likewise, the value of x in the above formula, may also be the same or different in the same or different molecules.

Examples of hydrocarbon radicals represented by R are alkyl radicals such as the methyl, ethyl, n-propyl, and isopropyl radicals, as well as the butyl and octadecyl radicals; alkenyl radicals such as the vinyl, allyl, and butadienyl radicals; cycloaliphatic hydrocarbon radicals such as cyclopentyl and cyclohexyl radicals, as well as cyclohexenyl and methyl cyclohexyl radicals; aryl radicals such as the phenyl radical; alkaryl radicals such as the tolyl radical; and aralkyl radicals such as the beta-phenylethyl radical.

Preferred examples of substituted monovalent hydrocarbon radicals represented by R are halogenated hydrocarbon radicals such as the 3,3,3-trifluoropropyl radical or the chlorophenyl and bromotolyl radicals; as well as the cyanoalkyl radicals such as the beta-cyanoethyl radical.

The examples of hydrocarbon radicals represented by R above, except for the vinyl radical, are also representative of the hydrocarbon radicals present in the hydrocarbon ether groups represented by Z.

Preferably, the substituted and unsubstituted hydrocarbon radicals represented by R and the hydrocarbon ether groups represented by Z contain from 1 to 18 carbon atoms.

It is preferred that at least 95 percent of the number of organic radicals, i.e., the radicals represented by R, in the diorganopolysiloxanes, be methyl radicals. However, if at least 0.01 percent of the number of organic radicals in the diorganopolysiloxanes are aryl radicals, preferably phenyl radicals, the molding compounds are even more flame-resistant, and the flame-resistance increases as the proportion of SiC-bonded phenyl radicals increases.

Preferably, the molding compositions of this invention contain diorganopolysiloxanes in an amount of from 0.1 to 150 percent by weight, and more preferably from 1 to 20 percent by weight, based on the weight of the organic polymer other than the diorganopolysiloxane.

The molding compositions of this invention may contain a single type of diorganopolysiloxane or a mixture containing at least two different types of diorganopolysiloxanes.

Although, silicon dioxide having a surface area of at least 50 m²/g is not an essential ingredient in the molding compositions of this invention, it does, however, aid in mixing the components of the molding compositions of this invention.

The silicon dioxide which is employed in the molding compositions of this invention can be pyrogenically produced silicon dioxide which retains the structure of dehydrated silicic acid hydrogel or any other type of precipitated silicon dioxide having a surface area of at least 50 m²/g. Mixtures of at least two of the above mentioned types of silicon dioxide may also be used. Preferably, the silicon dioxide is a pyrogenically produced silicon dioxide having a surface area of at least 50 m²/g.

The silicon dioxide having a surface area of at least 50 m²/g can be treated with a hydrophobic agent, e.g., trimethylethoxysilane, and/or can be otherwise modified on the surface by such methods as coating with stearic acid, zinc or calcium stearate to impart hydrophobic properties thereto. The silicon dioxide may be treated before, during or after mixing with at least a portion of the remaining components of the molding composition.

The surface area of the silicon dioxide is determined by the "Bet Method", i.e., by nitrogen adsorption in accordance with ASTM Special Technical Publication No. 51, 1941, page 95.

The upper limit for the surface area of the silicon dioxide having a surface area of at least 50 m²/g is critical and is preferably from 100 to 600 m²/g.

The amount of silicon dioxide having a surface area of at least 50 m²/g employed in the molding compositions of this invention is preferably up to a maximum of about 50 percent by weight, and more particularly from about 0.3 to 10 percent by weight, based on the weight of the organic polymer other than the diorganopolysiloxane.

The oxides or hydroxides of the rare earth elements (a) can be oxides or hydroxides of scandium, yttrium, lanthanum, cerium, praseodymium, neodymium, promethium, samarium, europium, gadolinium, terbium, dysprosium, holmium, erbium, thulium, ytteribium or lutecium, or mixtures of oxides and/or hydroxides of several of these elements, including monazite sand. The preferred rare earth compound is cerium hydroxide.

If the molding compositions of this invention contain oxides or hydroxides of element(s) of the rare earths (a), the amounts are preferably from 0.01 to 20 percent by weight, and more preferably from 0.1 to 5 percent by weight, based on the weight of the organic polymer other than the diorganopolysiloxane.

When graphite (b) is employed in the molding compositions of this invention, it must have a particle size which provides a uniform distribution of the graphite throughout the molding composition. Preferably, the diameter of the graphite does not exceed about 2 mm.

If the molding compositions of this invention contain graphite (b), the amount is preferably from 0.01 to 20 percent by weight, and more preferably from 0.1 to 10 percent by weight, based on the weight of the organic polymer other than diorganopolysiloxane.

The precious metals or their compounds or complexes (c) which can be employed in the molding compositions are silver, gold or platinum, as well as ruthenium, rhodium, palladium, osmium, iridium or a mixture of at least two such elements, or at least one compound or at least one complex of at least one such element. Metallic platinum, which may be supported on an inert carrier such as silicon dioxide, and compounds or complexes of platinum such as platinum dioxide, $H_2PtCl_6.6H_2O$, bis(gamma-picoline)-platinum dichloride, platinum divinyltetramethyldisiloxane complexes with or without detectable inorganic halogen and platinum-olefin complexes are preferred.

If the molding compositions of this invention contain precious metals or compounds or complexes of such metals (c), the amounts are preferably from 0.0001 to 0.1 percent by weight, and more preferably from 0.001 to 0.02 percent by weight, based on the weight of the organic polymer other than the diorganopolysiloxane.

The molding compositions of this invention may contain one substance or more than one substance selected from classes (a), (b) or (c), or they may contain a substance selected from classes (a) and (b) or from classes (a) and (c) or from classes (b) and (c), or from all the classes (a), (b) and (c).

In addition to the substances mentioned heretofore, the molding compositions of this invention may also contain substances which have been present or could have been present in molding compositions based on an organic polymer other than a diorganopolysiloxane or in molding compositions based on diorganopolysiloxanes or in molding compositions based on an organic polymer and a diorganopolysiloxane. Examples of such substances other than the silicon dioxide having a surface area of at least 50 m²/g, are fillers having a surface area less than 50 m²/g, as well as greater than 50 m²/g, fibrous fillers such as asbestos, pigments, soluble dyes, processing aids, aging preservatives, heat stabilizers, traditional flameproofing agents such as halogenated organic compounds, aluminum oxide trihydrate, antimony oxide, phosphates or phosphites, plasticizers, blowing agents such as azodicarbonamide, crosslinking agents except for organopolysiloxanes having Si-bonded hydrogen, agents which control the rate of crosslinking, and crosslinking aids.

Examples of fillers other than the silicon dioxide having a surface area of at least 50 m²/g are fillers having a surface area greater than or less than 50 m²/g, such as silicates, e.g., calcium silicate and zirconium silicate, quartz meal, diatomaceous earth, calcium carbonate, carbon blacks, mica, titanates, zinc oxide, litharge, red lead, and pyrogenically produced precipitated or crystalline titanium dioxide and pigments.

If the molding compositions of this invention contain fillers having a surface area of at least 50 m²/g other than the silicon dioxide having a surface area of at least 50 m²/g or fillers having a surface area of less than 50 m²/g, they are preferably present in amounts up to about 800 percent by weight and more preferably in an amount up to about 200 percent by weight, based on the weight of the organic polymer other than the diorganopolysiloxane.

Fillers other than silicon dioxide having a surface area of at least 50 m²/g, regardless of whether these fillers have a surface area greater than or less than 50 m²/g, can be treated to render them hydrophobic.

Examples of crosslinking agents which may be employed are organic peroxide compounds such as acyl peroxides, e.g., dibenzoyl peroxide, bis(4-chlorobenzoyl)peroxide, bis(2-chlorobenzoyl)peroxide, and bis-(2,4-dichlorobenzoyl)peroxide; aryl peroxides, such as dicumyl peroxide; perketals such as 2,5-bis(tert-butylperoxy)-2,5-dimethylhexane and 2,5-bis(tert-butylperoxy)-2,5-dimethyl-3-hexyne; and percarbonates, such as tert-butylperoxyisopropyl carbonate, as well as sulfur or organic sulfur donors such as tetramethylthiuram disulfide.

Crosslinking aids which may be employed are triallyl cyanurate and butanediol dimethacrylate. Crosslinking can also be achieved by radiation such as beta-rays or X-rays. However, it should be emphasized, that the molding compositions of this invention are not always crosslinked.

If the molding compositions of this invention contain crosslinking agents, the maximum amount is preferably about 10 percent by weight, and more preferably, about 5 percent by weight, based on the weight of the organic polymer other than the diorganopolysiloxane.

The components of the molding compositions of this invention can be mixed at temperatures of from $-20°$ C. to $+400°$ C., preferably at temperatures of from $+20°$ to $+150°$ C. Heat-sensitive components, such as organic peroxide compounds, are added only at temperatures at which they are stable. Generally, the components are preferably mixed at ambient atmospheric pressure, i.e., 1 bar or approximately 1 bar. If desired, however, higher or lower pressures may be used.

The various components of the compositions of this invention can be mixed together in any sequence providing premature crosslinking is avoided. Preferably, however, at least the diorganopolysiloxane and a substance selected from the class consisting of (a) oxides or hydroxides of the rare earth elements; (b) graphite, or (c) precious metals or their compounds or complexes; and silicon dioxide having a surface area of at least 50 m²/g, if used, are mixed together and this mixture is then mixed with the other components of the molding compositions of this invention, in order to produce homogeneous compositions and to simplify their storage.

The components of the molding compositions of this invention can be mixed by conventional mixing equipment, such as internal mixers, masticators or rolls.

The forming and crosslinking, if desired, of the molding compositions of this invention can be accomplished by any technique which has been used in molding compositions containing organic polymers other than diorganopolysiloxanes or in molding compositions containing diorganopolysiloxanes or compositions containing a mixture of diorganopolysiloxanes and polymers other than diorganopolysiloxanes.

The molding compositions of this invention may be used, for example, in manufacturing electrical insulation, providing they are substantially free of halogen or do not release large amounts of hydrogen halide in case of a fire, which could damage electrical or electronic systems, for example in computer installations, communication devices or nuclear power plants.

The molding compositions of this invention not only exhibit a greater degree of flame-resistance than previously known molding compositions, but they also have less tendency towards the formation of droplets during combustion. In addition, these compositions sometimes exhibit higher specific electrical resistance. Further-more, they can be extruded more readily and can be easily removed from the mold after compression. Also, they exhibit less surface adhesiveness.

In the following examples, all parts are by weight unless otherwise specified. The platinum complex used in the following examples is a platinum complex of 1,3-divinyl-1,1,3,3-tetramethyldisiloxane which has been prepared in accordance with Example 6 of U.S. Pat. No. 3,814,730 to Karstedt.

The degree of flame-resistance is specified by the value obtained in the determination of the oxygen index (LOI) according to ASTM D-2863. The higher the value, the higher the degree of flame-resistance. The specific electrical resistance is determined in accordance with the procedure described in DIN 53482/53596.

EXAMPLE 1

In each example, 100 parts of ethylene-propylene-diene terpolymer (EPDM; where the diene is a non-conjugated diene, e.g., butadiene) are mixed with a mixture containing 100 parts of a trimethylsiloxy end-blocked dimethylpolysiloxane having a viscosity of $10^7$ mPa.s at 25° C., 10 parts of a dimethylpolysiloxane having one Si-bonded hydroxyl group in each terminal unit and a viscosity of 60 mPa.s at 25° C., and 40 parts of pyrogenically produced silicon dioxide having a surface area of 150 m²/g, in the amounts specified in Table I. To the resultant mixture are added the other substances specified in Table 1, along with 3 parts of dicumyl peroxide. Plates 2 mm thick are prepared from the mixtures thus prepared by pressing for 15 minutes at 170° C. in a mold. The properties of the resultant plates are shown in Table 1.

EXAMPLE 2

About 1000 parts of ethylene-propylene-diene terpolymer (EPDM) is mixed with 200 parts of an aliphatic plasticizer, 1000 parts of aluminum silicate, 50 parts of zinc oxide and 10 parts of stearic acid. About 100 parts of this mixture is then mixed with a mixture containing 100 parts of a trimethylsiloxy terminated dimethylpolysiloxane having a viscosity of $10^7$ mPa.s at 25° C., 10 parts of a dimethylpolysiloxane having one Si-bonded hydroxyl group in each terminal unit with a viscosity of 60 mPa.s at 25° C., and 40 parts of pyrogenically produced silicon dioxide having a surface area of 150 m²/g, in the amounts specified in Table 2. The other substances specified in Table 2, and 3 parts of dicumyl peroxide are then added to the mixture. Plates 2 mm thick are prepared from the mixtures thus obtained by pressing for 15 minutes at 170° C. in a mold. The properties of these plates are shown in Table 2.

TABLE 2

|  | Examples | | | | Comparison Examples | | | | |
| --- | --- | --- | --- | --- | --- | --- | --- | --- | --- |
|  | A | B | C | D | a | b | c | d | e |
| Mixture of dimethylpolysiloxane and SiO₂, Parts | 5 | 5 | 5 | 8 | 0 | 5 | 0 | 0 | 0 |
| Cerium hydroxide, Parts | 1 | 0 | 0 | 0 | 0 | 0 | 1 | 0 | 0 |
| Platinum complex, Parts | 0 | 0.002 | 0 | 0 | 0 | 0 | 0 | 0.002 | 0 |
| Graphite, Parts | 0 | 0 | 4 | 4 | 0 | 0 | 0 | 0 | 4 |
| LOI, Percent | 23.5 | 23.5 | 27.5 | 29.0 | 20.0 | 20.5 | 20.0 | 20.0 | 20.0 |
| Specific Electrical Resistance ohm-cm | $2.10^{17}$ | $8.10^{15}$ | $5.10^{16}$ | $5.10^{16}$ | $8.10^{15}$ | $4.10^{16}$ | $8.10^{15}$ | $8.10^{15}$ | $1.10^{16}$ |
| Droplets formed during combustion | None | None | None | None | Yes | None | Yes | Yes | Yes |

EXAMPLE 3

The procedure of Example 2 using graphite as an additive is repeated except that 1000 parts of a copolymer of styrene and butadiene (SBR) is substituted for the 1000 parts of ethylene-propylene-diene terpolymer (EPDM). The following results are obtained:

TABLE 3

|  | Example | Comparison Examples | |
| --- | --- | --- | --- |
|  | A | a | b |
| Mixture of dimethylpolysiloxane and SiO₂, Parts | 5 | 0 | 0 |
| Graphite, Parts | 4 | 0 | 4 |
| LOI, Percent | 26.0 | 19.5 | 19.5 |
| Specific electrical | $2.10^{16}$ | $5.10^{15}$ | $6.10^{15}$ |

TABLE 1

|  | Examples | | | Comparison Examples | | | | |
| --- | --- | --- | --- | --- | --- | --- | --- | --- |
|  | A | B | C | a | b | c | d | e |
| Mixture of dimethylpolysiloxane and SiO₂, Parts | 5 | 5 | 5 | 0 | 5 | 0 | 0 | 0 |
| Cerium hydroxide, Parts | 1 | 0 | 0 | 0 | 0 | 1 | 0 | 0 |
| Complex of platinum, Parts | 0 | 0.002 | 0 | 0 | 0 | 0 | 0.002 | 0 |
| Graphite, Parts | 0 | 0 | 4 | 0 | 0 | 0 | 0 | 4 |
| LOI, Percent | 22.0 | 22.0 | 23.5 | 17.5 | 18.5 | 17.5 | 17.5 | 18.5 |
| Droplets Formed During Combustion | None | None | None | Yes | None | Yes | Yes | Yes |

EXAMPLE 4

The procedure of Example 2 using graphite as an additive is repeated except that 1000 parts of a copolymer of ethylene and vinyl acetate (EVA) is substituted for the 1000 parts of ethylene-propylene-diene terpolymer (EDPM). The following results are obtained:

TABLE 4

|  | Example A | Comparison Examples | |
|---|---|---|---|
|  |  | a | b |
| Mixture of dimethylpolysiloxanes and $SiO_2$, Parts | 5 | 0 | 0 |
| Graphite, Parts | 4 | 0 | 4 |
| LOI, Percent | 28.0 | 22.0 | 22.0 |
| Specific electrical resistance, ohm-cm | $1.10^{14}$ | $5.10^{13}$ | $5.10^{13}$ |
| Droplets formed during combustion | None | Yes | Yes |

What is claimed is:

1. A flame-resistant molding composition comprising (1) a diorganopolysiloxane which is free of hydrogen and contains at least 90 percent by weight of diorganopolysiloxane units, (2) an organic polymer selected from the group consisting of polymers of ethylene, propylene, isobutylene, methylbutene-1, butene-1, methylpentene-1, isoprene, butadiene, styrene, hexadiene, dicyclopentadiene, ethylidenenorbornene, vinyl chloride, vinylidene chloride, chloroprene, acrylic acid, methacrylic acid, acrylamide, methacrylamide, acrylonitrile, methacrylonitrile, methyl acrylate, methyl methacrylate, ethyl methacrylate, vinyl acetate, vinyl laurate, vinyl alcohols, saponification products of copolymers of ethylene and vinyl acetate, polyvinyl acetals, chlorosulfonated polyethylenes, polyamides, polyimides, polycarbonates, polyurethanes, polyacetals, polyethers, polysulfones, polyesters, polyepichlorohydrins, polycarbodiimides and graft or block copolymers of diorganopolysiloxanes obtained from the polymerization of a diorganopolysiloxane and at least one organic compound having at least one aliphatic carbon-carbon double bond, (3) graphite and (4) a crosslinking agent.

2. The composition of claim 1, wherein the composition contains silicon dioxide having a surface area of at least 50 $m^2/g$.

3. The composition of claim 1 or 2, wherein graphite is present in an amount of from 0.01 to 20 percent by weight, based on the weight of the organic polymer.

4. The composition of claim 1 or 2, wherein graphite is present in an amount of from 0.1 to 10 percent by weight, based on the weight of the organic polymer.

5. The composition of claim 1, wherein the organic polymer is a terpolymer of ethylene, propylene and a diene selected from the group consisting of butadiene, hexadiene, dicyclopentadiene and ethylidene-norbornene.

6. The composition of claim 1, wherein the organic polymer is obtained from the polymerization of ethylene and butene-1.

7. The composition of claim 1, wherein the organic polymer is obtained from the polymerization of isobutylene and isoprene.

8. The composition of claim 1, wherein the organic polymer is obtained from the polymerization of ethylene and vinyl acetate.

9. The composition of claim 1, wherein the organic polymer is obtained from the polymerization of butadiene and acrylonitrile.

10. The composition of claim 1, wherein the organic polymer is obtained from the polymerization of styrene and butadiene.

11. The composition of claim 1, wherein the organic polymer is obtained from the polymerization of styrene and acrylonitrile.

12. The composition of claim 1, wherein the organic polymer is obtained from the polymerization of styrene and methacrylate.

13. The composition of claim 1, wherein the organic polymer is obtained from the polymerization of acrylonitrile, styrene and butadiene.

14. The composition of claim 1, wherein the organic polymer is obtained from the polymerization of ethylene and methylacrylate.

15. The composition of claim 1, wherein the organic polymer is obtained from the polymerization of vinyl chloride and vinyl acetate.

* * * * *